United States Patent
Mochizuki et al.

(10) Patent No.: US 6,856,756 B1
(45) Date of Patent: *Feb. 15, 2005

(54) DIGITAL DATA TRANSMITTING APPARATUS AND RECEIVING APPARATUS

(75) Inventors: Kazuyoshi Mochizuki, Hamamatsu (JP); Daizoh Nagahara, Hamamatsu (JP); Toshio Suzuki, Hamamatsu (JP); Toshihito Uchiyama, Hamamatsu (JP); Masamichi Furukawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,759

(22) Filed: Jun. 7, 1999

(30) Foreign Application Priority Data

Jun. 8, 1998 (JP) .......................................... 10-159545

(51) Int. Cl.[7] .............................................. H04N 5/783
(52) U.S. Cl. ........................................ 386/68; 386/111
(58) Field of Search ............................ 386/6–8, 33, 68, 386/81–82, 111–112, 125–126; 725/74–85; H04N 5/76, 5/781, 5/783

(56) References Cited

U.S. PATENT DOCUMENTS 5,521,918 A  *  5/1996  Kim .......................... 370/428
5,729,516 A  *  3/1998  Tozaki et al. ............. 369/53.21
5,801,781 A  *  9/1998  Hiroshima et al. ......... 348/441
5,894,328 A  *  4/1999  Negishi .................. 375/240.25
5,902,115 A  *  5/1999  Katayama ............... 434/307 A
5,963,202 A  * 10/1999  Polish ........................ 345/723
6,067,400 A  *  5/2000  Saeki et al. .................. 386/95
6,233,393 B1 *  5/2001  Yanagihara et al. ......... 386/125
6,370,322 B2 *  4/2002  Horiguchi et al. ............ 386/95
6,438,317 B1 *  8/2002  Imahashi et al. ........... 386/109
6,453,110 B1 *  9/2002  Kawamura et al. ........... 386/46

* cited by examiner

Primary Examiner—Thai Tran
(74) Attorney, Agent, or Firm—Pillsbury Winthrop LLP

(57) ABSTRACT

A digital data transmitting apparatus including a reproducing device classifies serial packet data that are read at a variable rate from a digital data medium and demodulates into at least picture data, audio data and other data, an MPEG transport stream (MPEG-TS) generating device generates an MPEG-TS based on the digital data, and a digital interface device converts the generated MPEG-TS into digital transmission data and transmits the digital transmission data at a predetermined transmission rate. A digital data receiving apparatus including a digital interface device is operable at a predetermined transmission rate, a digital data receiving device receives digital data via the digital interface device, an MPEG-TS reproducing device reproduces an MPEG-TS from the received digital data, a reproducing device classifies the reproduced MPEG-TS into at least picture data, audio data, and private data, and a control device controls the reproducing device based on the private data.

13 Claims, 6 Drawing Sheets

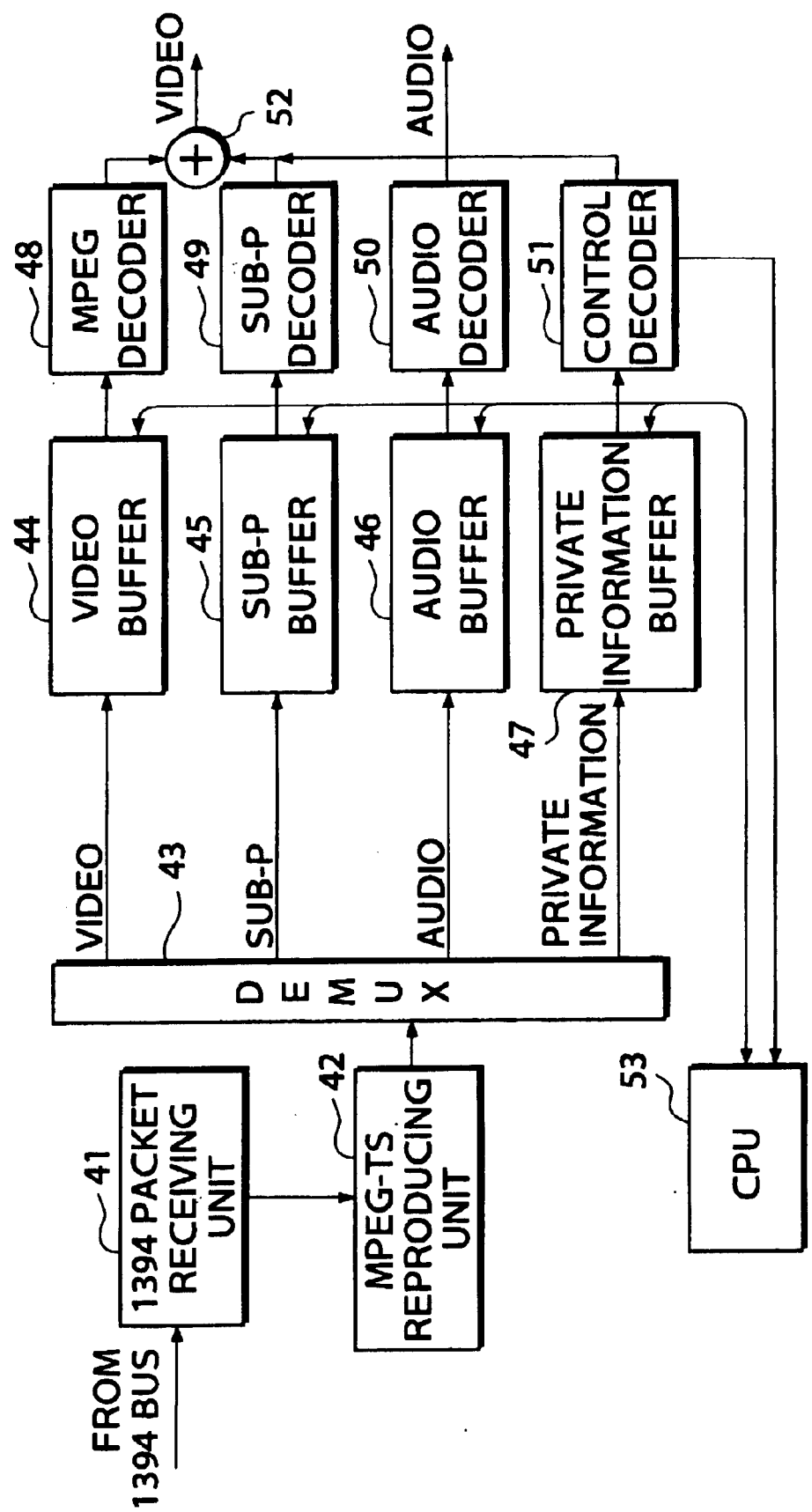

DIGITAL DATA TRANSMITTING APPARATUS AND RECEIVING APPARATUS

BACKGROUND OF THE INVENTION

1. Field of the Invention

The present invention relates to digital data transmitting apparatus and receiving apparatus that can be applied to systems in which digital apparatuses or equipment, such as a DVD (digital video disc) recording/reproduction apparatus, digital VCR, and digital TV, are connected to each other via suitable interfaces having a fixed data transfer rate, such as an IEEE 1394 bus.

2. Prior Art

In a conventional digital data transmission system, digital recording/reproduction apparatuses, such as an optical disc (e.g., DVD) reproduction apparatus, digital TV, digital VCR, and others, are connected to each other via an IEEE-1394 bus that serves as an intelligent interface, so that data contents, such as pictures and music, are transmitted and received between these digital apparatuses. When digital data is transmitted and received between these apparatuses, the system checks if each of the apparatuses operates in a manner as intended by the creator or producer who created the data contents, and, if any one of the apparatuses does not operate as intended by the creator, data transfer is prohibited, to thereby prevent the user from illegally copying the picture and/or music contents against the intention of the creator. It is thus possible to construct a digital data transmission system that satisfies the demands of both suppliers of the contents and general users by permitting digital copying under certain restrictions, utilizing the mutual authentication function as described above.

The IEEE-1394 interface, when it is designed to handle 1000 Mbps, for example, is able to transmit 4915 units of data each counted as a unit of transmission of certain data, during a basic transmission cycle of 125 $\mu$S. The number of units that are transmittable during the basic cycle corresponds to a bit rate of each type of signal to be transmitted. For example, 1200 units is employed when transmitting picture information at the average bit rate of 10 Mbps, and 704 units is employed when transmitting music information at the average bit rate of 2 Mbps. In the transmitter-side apparatus, therefore, the transmission rate is determined in advance based on the contents to be transmitted, and then transmission is carried out at the transmission rate thus determined.

On the other hand, picture/music information that is read out from DVD is read out at a variable bit rate since the information was encoded at a variable bit rate according to the MPEG (Moving Picture Expert Group) method. Namely, the frequency of reading picture information containing more active or fast-moving pictures differs from that of reading picture information containing less active or slow-moving pictures. In this case, the read-out timing is determined by monitoring the storage state of data in an input buffer memory, for example. A conventional data transmission mode or method for transmitting the information read at such a variable rate through the fixed-rate IEEE 1394 bus is described at Part 4 of IEC 61883.

The IEC 61883, however, only specifies the manner of transmitting data that were packeted as an MPEG-TS, onto the IEEE-1394 bus, and provides no description on how to convert various information recorded on a DVD into the form of an MPEG-TS signal, nor specifies an effective transmission method. Also, in the data transmission method of IEC 61883, such information that is required to inform the receiver of the reproduction state of the transmitter-side apparatus is not transmitted to the receiver-side apparatus, causing a problem that the receiver-side apparatus fails to perform the same reproducing operations as performed by the transmitter-side apparatus. Namely, serial packets read at a variable rate from DVD contain time stamps representing the reproduction timing, and display timing of each image or picture is determined through an operation to compare the time stamps with the absolute time or pulses produced by the reproduction apparatus. If the reproduction apparatus receives a command to perform fast-forward, reverse reproduction or other operations, the time stamps of picture information may be skipped at certain intervals or advanced in the reverse direction. This will cause no problem when the reproduction apparatus itself performs such an operation according to a command entered through the reproduction apparatus, but, when data is transmitted as it is from the transmitter-side apparatus to the receiver-side apparatus, such information that instructs a reproduction manner is not supplied to the receiver-side apparatus, thus causing a problem in reproducing operations of the receiver-side apparatus.

Also, since digital data is transmitted from the transmitter-side apparatus in accordance with the state of buffering of the reproduction apparatus in the transmitter-side apparatus, the data may be transmitted even if a buffer(s) of the reproduction apparatus in the receiver-side apparatus is/are in the full state, or may not be transmitted even if the buffer(s) is/are in the empty state.

SUMMARY OF THE INVENTION

It is therefore an object of the present invention to provide digital data transmitting apparatus and receiving apparatus that permit appropriate transmission or transfer of information between transmitter-side apparatus and receiver-side apparatus, to thereby enable appropriate reproducing operations in the receiver-side apparatus.

To attain the above object, the present invention provides a digital data transmitting apparatus comprising a reproducing device that classifies digital data in the form of serial packet data comprising picture data, audio data and other data that are read at a variable rate from a digital data medium and demodulated, into at least picture data, audio data and other data, and buffers and decodes each of the picture data, audio data and other data, so as to generate a reproduction signal, an MPEG transport stream (MPEG-TS) generating device that generates an MPEG transport stream based on the digital data according to MPEG (Moving Picture Expert Group), and a digital interface device that converts the MPEG transport stream generated by the MPEG transport stream generating device, into digital transmission data, and transmits the digital transmission data at a predetermined transmission rate.

Specifically, the MPEG transport stream generating device generates the MPEG transport stream, based on all of the picture data, audio data and other data, or at least one type of data selected from the picture data, audio data and other data.

Preferably, the MPEG transport stream generating device packets control information as private data, the control information comprising data for matching a reproduction state of the reproducing device with a reproduction state of a receiver-side apparatus that receives the digital transmission data.

Also preferably, the control information comprises information indicating at least one operating state of the reproducing device that is selected from a reproduction speed, a reproduction direction, a still-picture mode, freeze-frame feed, a pause, a stop and play-back.

Preferably, the control information comprises information relating to control of the buffering of the reproducing device.

More preferably, the reproducing device includes a buffer memory that temporarily stores the picture data, and wherein the control information comprises information indicating that the buffer memory has been cleared.

Preferably, the reproducing device extracts sub-picture data from the digital data read at a variable rate from the digital data medium, and wherein the MPEG transport stream generating device packets the extracted sub-picture data as independent private data.

To attain the above object, the present invention also provides a digital data receiving apparatus comprising a digital interface device that is operable at a predetermined transmission rate, a digital data receiving device that receives digital data via the digital interface device, an MPEG transport stream (MPEG-TS) reproducing device that reproduces an MPEG transport stream according to MPEG (Moving Picture Expert Group), from the digital data received by the digital data receiving device, a reproducing device that classifies the MPEG transport stream reproduced by the MPEG transport stream reproducing device, into at least picture data, audio data, and private data, and buffers and decodes each of the picture data, audio data and private data, so as to generate a reproduction signal, and a control device that controls the reproducing device based on the private data.

Preferably, the private data comprises information indicating at least one operating state of the reproducing device that is selected from a reproduction speed, a reproduction direction, a still-picture mode, freeze-frame feed, a pause, a stop and play-back, and wherein the control device controls a reproducing operation of the reproducing device based on the information.

Also preferably, the private data comprises information relating to control of the buffering of the reproducing device, and wherein the control device controls the buffering of the reproducing device based on the information relating to control of the buffering.

Preferably, the reproducing device includes a buffer memory that temporarily stores the picture data, and the private data contains control information as a command to clear the buffer memory, while the control device clears the buffer memory based on the control information.

According to the present invention, after selecting all or part of picture data, music data, and other data that are serial packet data read at a variable rate from a digital video disk, or the like, and demodulated, the selected data is converted into an MPEG-TS (MPEG transport stream) to provide digital transmission data. This arrangement makes it easy to select certain data from those into which the digital data was classified, and also makes it easy to transmit only desired data. Furthermore, only desired or necessary data can be easily received using packet ID of MPEG-TS. Since the data to be transmitted is in the form of an MPEG-TS used for CS broadcasting, or the like, the receiver-side apparatus may be readily selected from generally used ones capable of reproducing MPEG-TS.

Also, necessary information can be freely transmitted as private data of MPEG-TS, including such information that is used for matching a reproducing mode of the transmitter-side apparatus with that of the receiver-side apparatus. For example, if the private data includes information indicative of a reproducing operation including reproducing speed and reproducing direction, such as fast-forward, reverse reproduction or a pause, of the reproducing device of the transmitter-side apparatus, the receiver-side apparatus may acquire knowledge of the reproducing operation on the transmitter side, referring to the private information, even if the data is transmitted as it is from the transmitter-side apparatus to the receiver-side apparatus. This enables matching of the reproduction mode of the receiver side with that of the transmitter side. Also, if the private data contains control information concerning buffering, such as reset of buffer(s) or address control of buffer(s), buffer control in the receiver-side apparatus may be performed in accordance with or in synchronization with buffer control in the transmitter-side apparatus, thus eliminating any problem due to mismatching.

If sub-picture data is transmitted as an independent packet, along with audio data, the sub-picture data may be advantageously used as display information of an audio amplifier.

The above and other objects, feature, and advantages of the invention will become more apparent from the following detailed description taken in conjunction with the accompanying drawings.

BRIEF DESCRIPTION OF THE DRAWINGS

FIG. 6 is a block diagram showing the configuration of a reproducing device on the receiver side according to one embodiment of the present invention.

DETAILED DESCRIPTION OF PREFERRED EMBODIMENT

The present invention will be described in detail with reference to the accompanying drawings showing a preferred embodiment thereof.

Figure 1:
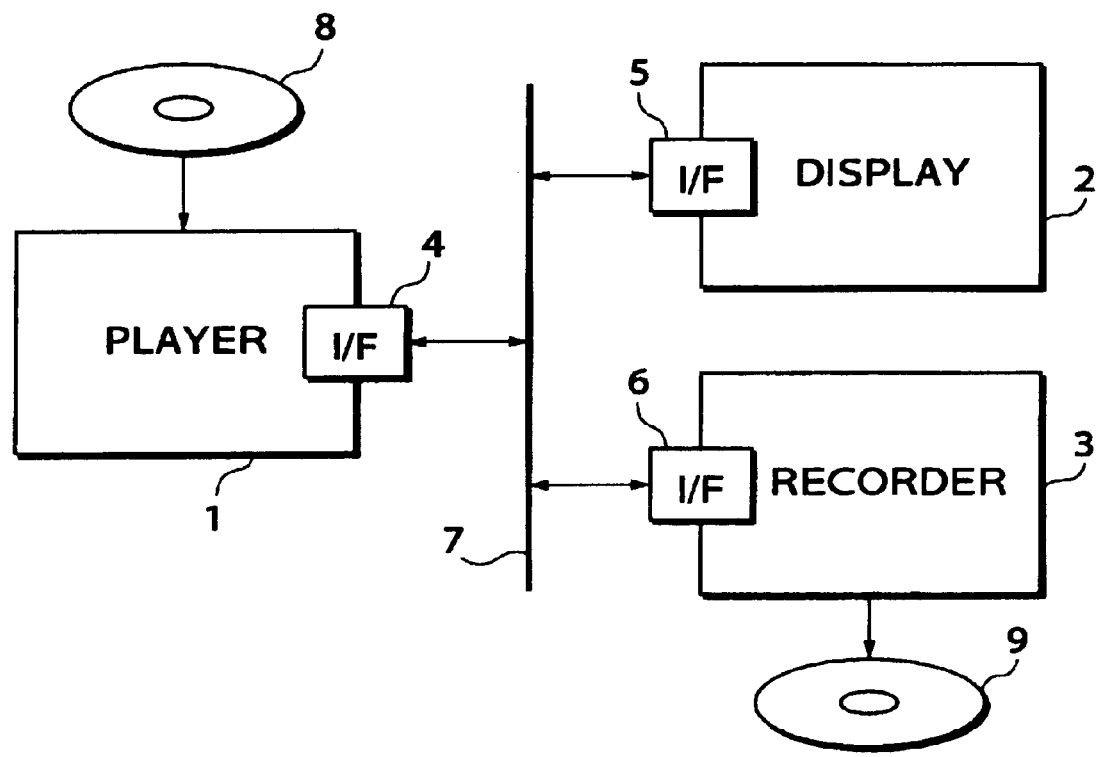
FIG. 1 is a block diagram showing the construction of a digital data transmission system according to one embodiment of the present invention.

Referring first to FIG. 1, there is shown the construction of a digital data transmitter/receiver system according to one embodiment of the present invention.

In the system shown in FIG. 1, a transmitter-side apparatus in the form of a DVD player 1 and receiver-side apparatuses in the form of a display 2 and a DVD recorder 3 are connected to each other through respective interfaces 4, 5, 6 and a bus 7 that are designed according to IEEE-1394. The DVD player 1 transmits digital data obtained by reproducing picture and/or music contents recorded as a transmission source on a DVD 8, to the display 2 and recorder 3 via the bus 7. The recorder 3 records the received digital data on a DVD 9 so long as digital copying of the data is permitted.

Figure 2:
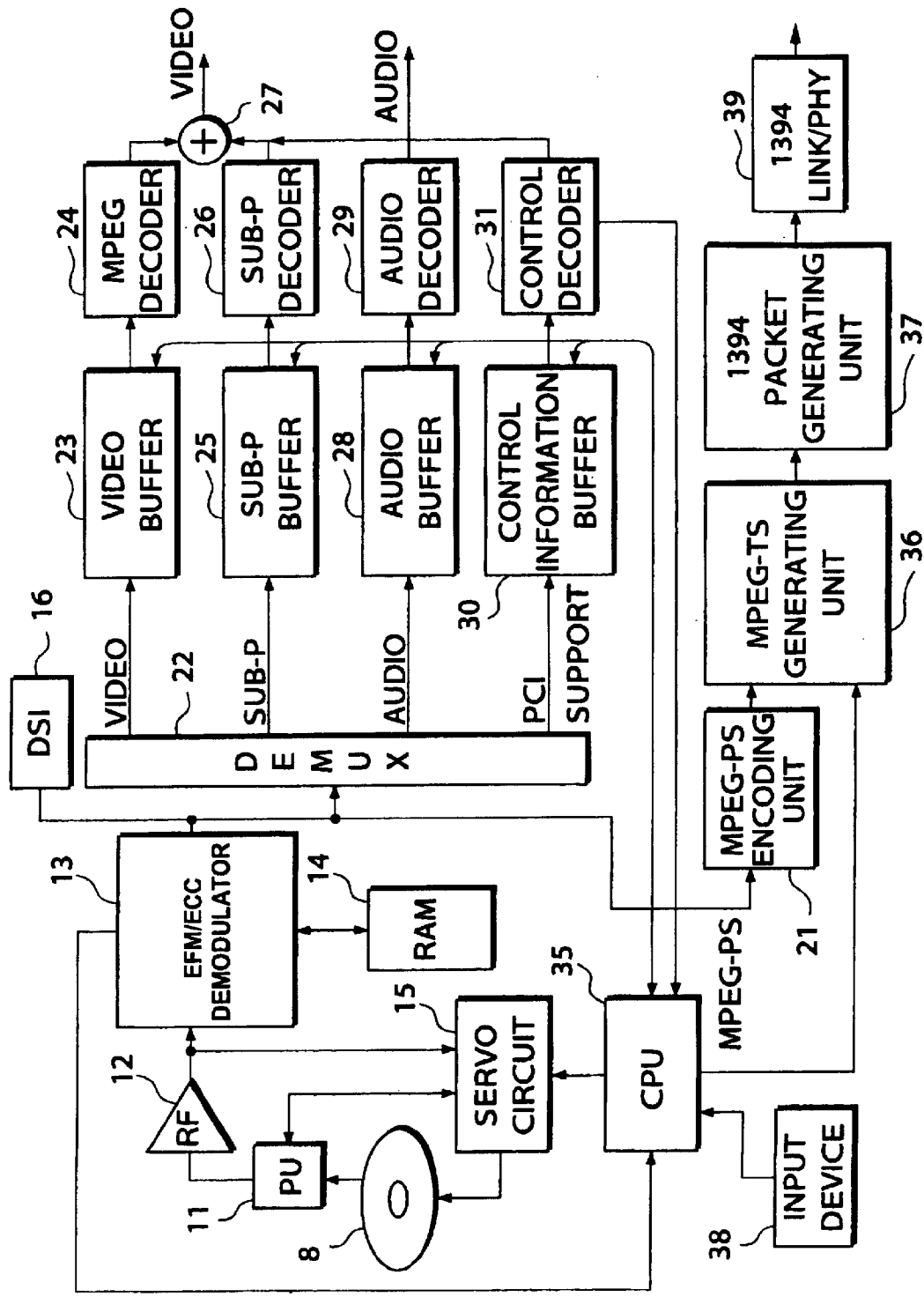
FIG. 2 is a block diagram showing the configuration of a player on the transmitter side in the system of FIG. 1.

FIG. 2 shows details of the player 1 of FIG. 1.

Picture data and/or music data are recorded on the DVD 8 in the form of a MPEG program stream (hereinafter referred to as MPEG-PS). A pick-up 11 reads out data recorded on the DVD 8, including such picture/music data, and the data read by the pick-up 11 is then amplified by an RF amplifier 12, and transmitted to an EFM/ECC demodulator 13 that performs demodulating and error-correcting operations on the data while writing or reading it into or from the RAM 14. A servo circuit 15 controls rotation of the DVD 8 and tracking, focusing and power of the pick-up 11, based on the output of the RF amplifier 12. The pick-up, RF amplifier 12, EFE/ECC demodulator 13, RAM 14 and servo circuit 15 constitute a front-end block of the circuit of FIG. 2.

The data on which demodulation and error-correction have been performed by the EFM/ECC demodulator 13 is supplied to a DSI decoder 16, demultiplexer (DEMUX) 22, and MPEG-PS decoding unit 21. The DSI decoder 16 extracts DSI (Data Search Information) that provides an address used for searching a picture to be displayed from among those contained in the data recorded on the DVD 8, and generates a necessary control signal. The DEMUX 22 classifies the recorded data into video data, sub-picture data, audio data and control data. The video data, which was coded according to MPEG2, is once stored in a video buffer 23, and then decoded by an MPEG decoder 24. The sub-picture data comprises sub-picture information representing characters such as subtitles, graphics, and the like, that are superimposed on main pictures. The sub-picture data is once stored in a sub-picture buffer 25, then decoded by a sub-picture decoder 26 and supplied to an adder 27 to be added to the video signal, and the resulting video signal is generated as a reproduction video signal. The audio data is once stored in an audio data buffer 28, and then decoded by an audio decoder 29 and generated as a reproduction audio signal. The control data comprises PCI (Presentation Control Information), for example, and other auxiliary information. The PCI provides highlight information needed for producing a menu screen, and the like. The auxiliary information includes those relating to copyright, for example. These control data are once stored in a control information buffer 30, and then decoded by a control decoder 31 and used for giving an intensity or brightness level to the adder 27 for controlling highlight display, or controlling other components through a CPU 35. These components described just above constitute a back-end block of the circuit of FIG. 2.

The MPEG-PS decoding unit 21 converts received MPEG-PS into MPEG-PES (Packetized Elementary Stream), and supplies it to an MPEG-TS generating unit 36. The MPEG-TS generating unit 36 also receives operating information of an input device 38 through the CPU 35. The MPEG-TS generating unit 36 generates an MPEG2-TS by selecting all of the MPEG-PES or only required data from the MPEG-PES, based on these data, and outputs the MPEG2-TS to a 1394 packet generating unit 37. The 1394 packet generating unit 37 generates IEEE-1394 packets from the MPEG2-TS, and outputs the packets to the bus 7 via a 1394 LINK/PHY unit 39. The 1394 LINK/PHY unit 39 includes a 1394 LINK portion that performs operations associated with a link layer of IEEE 1394, namely, transmits and receives a fixed amount of packets, such as pictures and voice, at the cycle of 125 μs in an isochronous (synchronous) transfer mode, or-transfers files in an asynchronous transfer mode. The 1394 LINK/PHY unit 39 also includes a 1394 PHY portion that performs operations associated with a physical layer of IEEE 1394. The MPEG-TS generating unit 36, 1394 packet generating unit 37 and the 1394 LINK/PHY unit 39 constitute the above-indicated interface 4.

Figure 3:
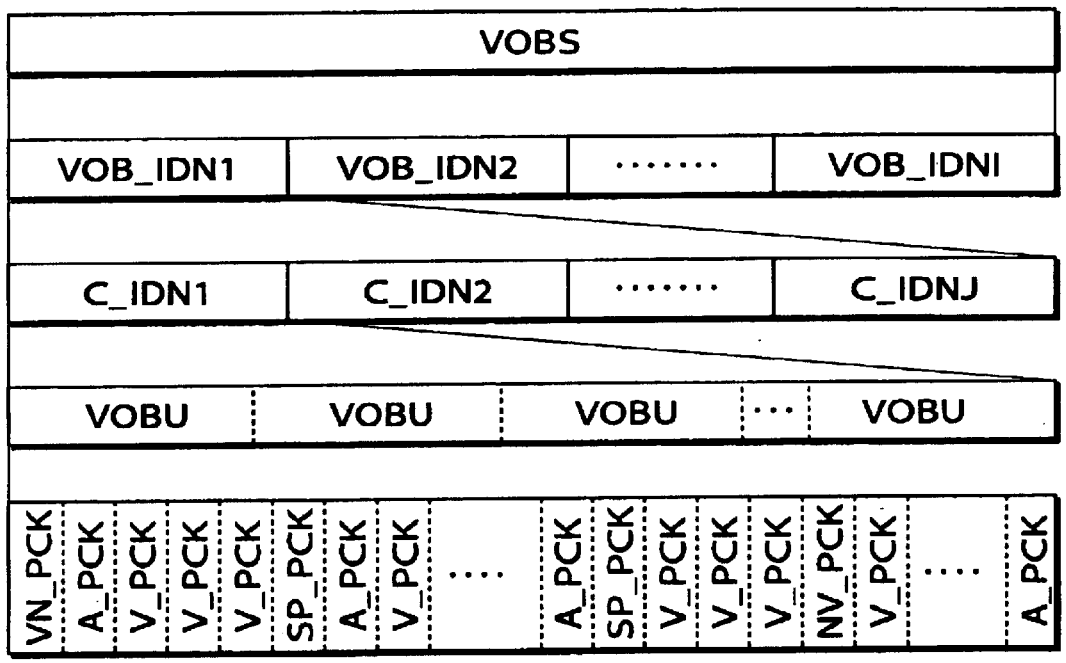
FIG. 3 is a view showing a principal part of a storage format of DVD.

FIG. 3 shows a principal part of a storage format of the DVD 8.

Main data of DVD is recorded on the basis of a unit called VOD (Video Object). An identification (ID) number is assigned to each VOB, and a plurality of VOBs constitute VOBS (Video Object Set). Each VOB is divided into a plurality of cells (C: Cell) each having an identification (ID) number. Each of the plurality of cells is further divided into a plurality of VOBUs (Video Object Units). Each VOBU consists of a plurality of sets of packet data called "pack". The pack contained in the leading or top part of the VOBU is NV-PCK (Navigation Pack) in which control information is recorded, and the NV-PCK is followed by V-PCK (Video Packs) as picture information, A-PCK (Audio Packs), and SP-PCK (Sub-Picture Packs) in which characters, graphics, and the like are recorded as sub-picture information, such that these packs are arranged at random.

Figure 4A:
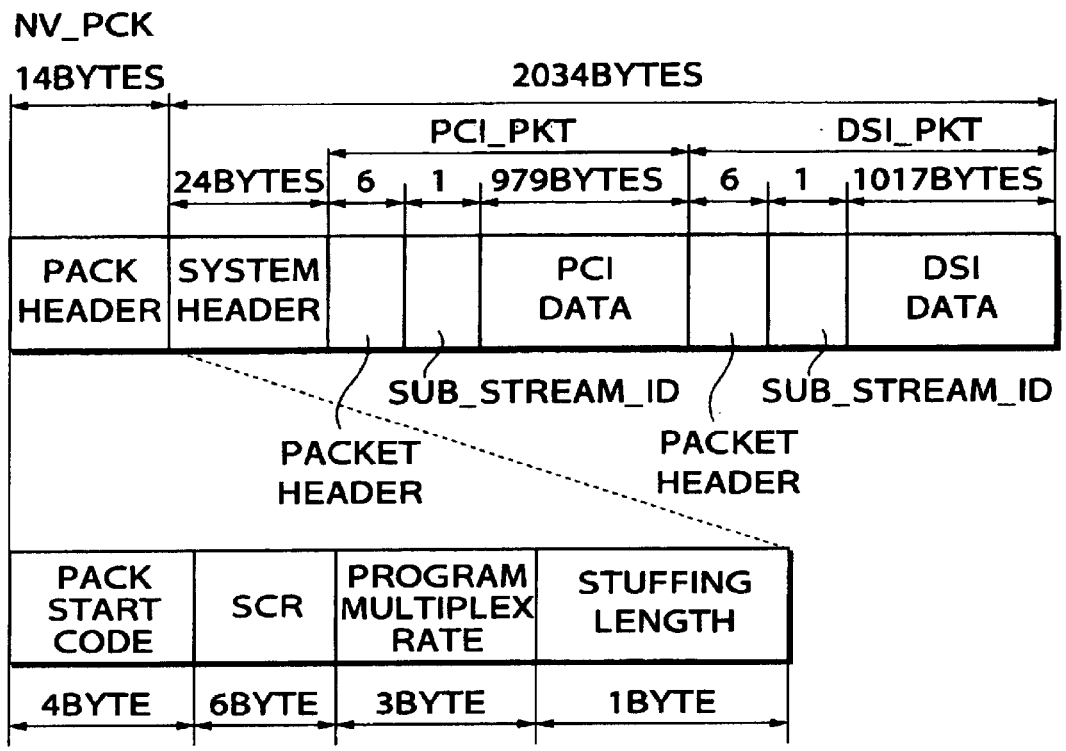
FIG. 4A is a view showing details of Navigation Pack contained in the storage format of FIG. 3.
Figure 4B:
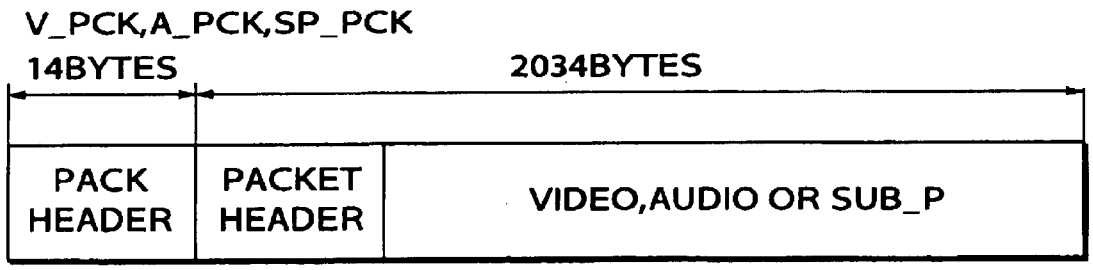
FIG. 4B is a view showing details of Video Pack, Audio Pack or Sub-Picture Pack contained in the storage format of FIG. 3.

FIGS. 4A and 4B show the packs in detail. Each pack is composed of a 14-byte pack header and 2034-byte at least one packet, and a padding packet(s) may be inserted, or stuffing may be inserted into the packet header, so that the whole pack amounts to 2048 (ILB) bytes. The pack header is composed of a 4-byte pack start code, 6-byte SCR (System Clock Reference) indicating the reproduction start time, 3-byte program multiplex rate, and one-byte stuffing length indicating the length of stuffing thus inserted.

In the case of NV-PCK as shown in FIG. 4A, the pack header of the pack is followed by a 24-byte system header, 986-byte PCI packet, and 1024-byte DSI packet. Each of the PCI packet and DSI packet consists of a 6-byte packet header, one-byte sub-stream ID, and the following data. In the case of V-PCK, A-PCK, SP-PCK as shown in FIG. 4B, each pack includes a pack header similar to that of the NV-pack, and the pack header is followed by at least one packet comprising a packet header and the following data.

These data are sequentially read out from the DVD 8, divided by the DEMUX 22 into respective packs, and written into the corresponding buffers 23, 25, 28, 30. The amount of data stored in each of the buffers 23, 25, 28, 30 is monitored by the CPU 35, or the like, and data is read from the DVD 8 so that the buffers do not overflow or underflow. Thus, although data is read from the DVD 8 and written into the RAM 14 at a fixed rate, the data is supplied from the RAM 14 to the DEMUX 22 at a variable rate.

The video data, sub-picture data, audio data and control data that have been decoded by the MPEG-PS decoding unit 21 are converted by the MPEG-TS generating unit 36 into MPEG2-TS. Since the types of information that can be transmitted in the form of MPEG2-TS are video signal, audio signal and private information, all of sub-picture data, PCI data, DSI data and auxiliary information, and OSD (On Screen Display) information produced by the player itself, or only necessary one(s) of these items of information are included in the private information (control information). At this time, the CPU 35 may control the MPEG-TS generating unit 36 so as to select only desired data for transmission, for example, select only audio data to be transmitted. In addition to the above-indicated information, such information that indicates operating states, such as fast-forward, reproduction in the reverse direction, and pause, that were entered through the input device 38 may also be supplied to the MPEF-TS generating unit 36 under control of the CPU 35, and transmitted as private information. It is, of course, possible to add the information indicating these operating states to the video data, and transmit the information as-part of the video data. Also, the sub-picture data received by the 1394 packet generating unit 37 through the MPEG-TS generating unit 36 may be generated as a packet of independent private data, 1.5 which is then transmitted along with audio data and used as display information for use in an audio amplifier.

Figure 5:
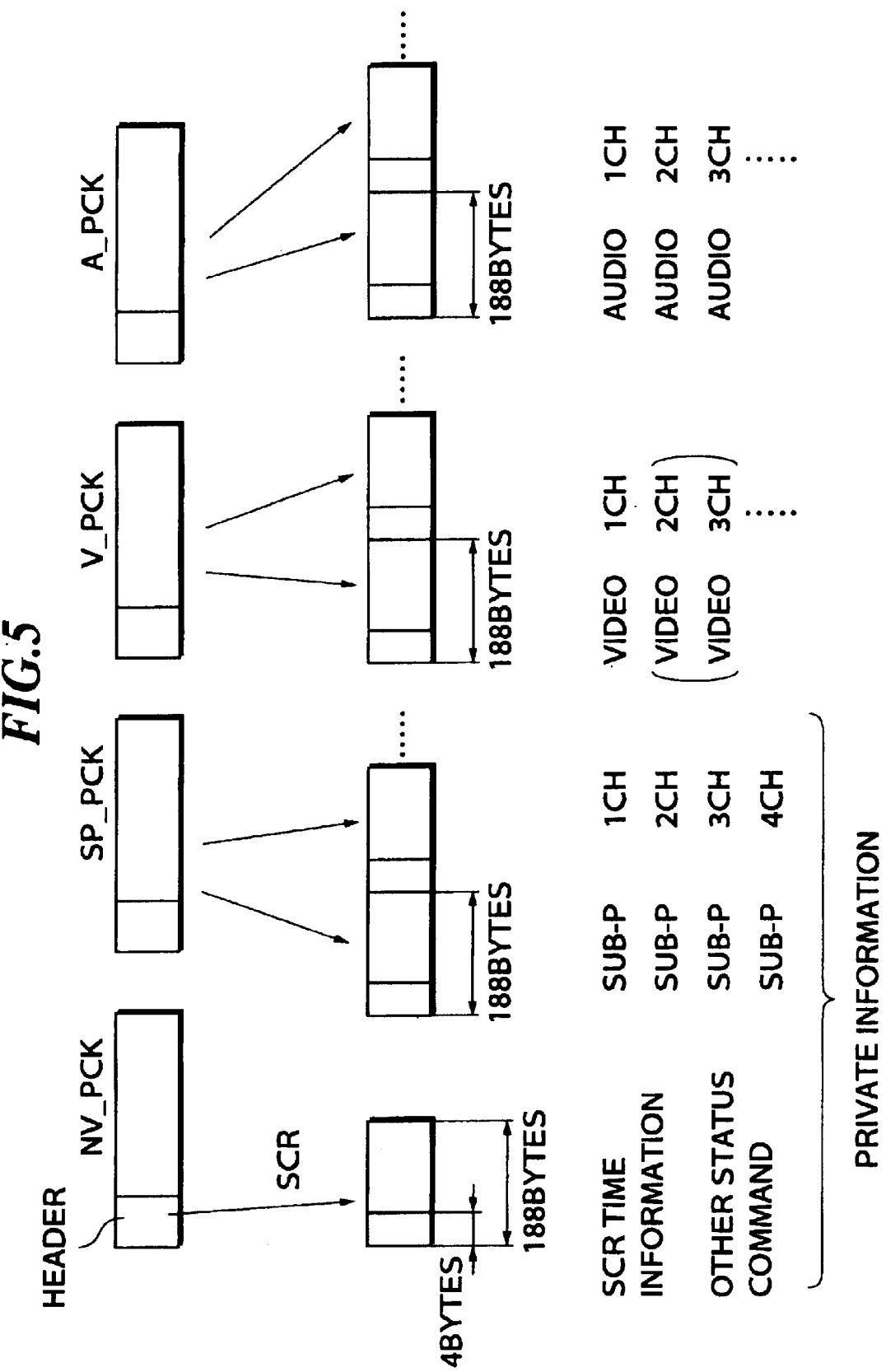
FIG. 5 is a view showing MPEG2-TS produced from each pack.

FIG. 5 shows MPEG-TS generated from each—pack of data recorded on the DVD. The MPEG-TS generating unit 36 generates a MPEG-TS packet having a fixed length of 188 bytes for each type of data, from each of the packs into which the data from the DVD has been divided. The MPEG-TS packet consists of a 4-byte header portion and a 184-byte data portion. More specifically, the MPEG-TS generating unit 36 extracts SCR (System Clock Reference) from the pack header portion of the NV-PCK, produces a packet of time information based on the extracted data, adds a header including a unique PID (Packet Identifier) to the packet, and transmit the resultant packet as independent private information. For V-PCK and A-PCK, the SCR contained in each pack, and a header including PID and a corresponding channel number are added and the resulting data is transmitted individually.

FIG. 6 shows the construction of a reproducing device of the receiver-side apparatus. The receiver-side apparatus of FIG. 6 includes a 1394 packet receiving unit 41 that receives 1394 packets transmitted via the IEEE-1394 bus 7, and a MPEG-TS reproducing unit 42 that reproduces or coverts the received 1394 packets into MPEG-TS. The MPEG-TS thus reproduced is classified into video data, sub-picture data, audio data and private information. These video data, sub-picture data, audio data and private information are then stored in a video buffer 44, sub-picture buffer 45, audio buffer 46, and a private information buffer 47, respectively, and then decoded by an MPEG decoder 48, sub-picture decoder 49, audio decoder 50, and a control decoder 51, respectively. The outputs of the MPEG decoder 48 and sub-picture decoder 49 are added together by an adder 52, and generated as a video signal. Control data decoded by the control decoder 51 is supplied to a CPU 53, which in turn controls the respective buffers 44 through 47.

Where the reproduction apparatus of the transmitter-side apparatus performs reproduction of data in a special manner, such as fast-forward or reverse reproduction, information indicative of the manner of reproduction is transmitted as private information to the receiver-side apparatus. The reproduction apparatus of the receiver-side apparatus then performs reproducing operations in the same manner as in the transmitter-side apparatus, by adjusting the order or interval of reproduction based on time stamps contained in the video data transmitted from the transmitter-side apparatus.

The above-indicated buffers 23, 25, 28, 30, 44–47 may be controlled through the following operations:

(1) The buffers may be once cleared when the player on the transmitter side performs a heads-out operation. In this case, buffer-clear information is transmitted to the receiver-side apparatus, and the buffers of the receiver-side apparatus are also cleared.

(2) The states of use of the buffers in the transmitter-side apparatus are transmitted to the receiver-side apparatus, and, when a large difference arises in the state of use of buffers between the transmitter-side apparatus and the receiver-side apparatus, the receiver-side apparatus performs frame subsampling, repeated reproduction, or other operation, so as to reduce or adjust the difference.

(3) Where the amount of data stored in the buffers of the transmitter-side apparatus exceeds a permissible value, frame subsampling or repeated reproduction is performed so that the amount of data stored in the buffers falls within the permissible value.

More specifically, trick-play control information, such as fast-forward, reverse or backward reproduction, and slow reproduction, only requires, for example, eight bits. Of the eight bits, three bits may provide information representing a reproduction mode, as shown in TABLE 1 below.

TABLE 1

| Value | Reproduction Mode |
| --- | --- |
| 000 | fast-forward reproduction |
| 001 | slow-forward reproduction |
| 010 | pause |
| 011 | fast-backward reproduction |
| 100 | slow-backward reproduction |
| 101, 111 | normal reproduction |

Out of the remaining bits, four bits provide the following control information:

Bit 1: field information to be displayed

Bit 2: flag for replacing a lacking macro block by a macro block of the previous image Bit 3: flag for encoding only the top coefficient Bit 4: information on the number of images to be repeatedly displayed Although the above-described control information may be transmitted as IEEE 1394 commands, it is difficult for the conventional system to record the information where the receiver is in the form of a recording apparatus. In this point of view, the system of the present embodiment is advantageous in that these control signals may be easily recorded on a DVD.

What is claimed is:

1. A digital data transmitting apparatus comprising:
a reproducing device that classifies digital data in the form of serial packet data comprising picture data, audio data and other data that are read at a variable rate from a digital data medium and demodulated into at least picture data, audio data and other data, and buffers and decodes each of the picture data, audio data and other data, so as to generate a reproduction signal;
an MPEG transport stream (MPEG-TS) generating device that generates an MPEG transport stream based on said digital data according to MPEG (Moving Picture Expert Group), wherein said MPEG-TS generating device packets control information as private data, said control information comprising data for matching a reproduction state of said reproducing device with a reproduction state of a receiver-side apparatus that receives digital transmission data; and
a digital interface device that converts the MPEG transport stream generated by said MPEG-TS generating device into the digital transmission data, and transmits the digital transmission data at a predetermined transmission rate.

2. A digital data transmitting apparatus according to claim 1, wherein the control information comprises information indicating at least one operating state of the reproducing device that is selected from a reproduction speed, a reproduction direction, a still picture mode, freeze-frame feed, a pause, a stop or play-back.

3. A digital data transmitting apparatus according to claim 1, wherein the control information comprises information relating to control of said buffering of said reproducing device.

4. A digital data transmitting apparatus according to claim 1, wherein said reproducing device includes a buffer memory that temporarily stores the picture data, and wherein the control information comprises information indicating that the buffer memory has been cleared.

5. A digital data receiving apparatus comprising:
- a digital interface device that is operable at a predetermined transmission rate;
- a digital data receiving device that receives digital data via said digital interface device;
- an MPEG transport stream (MPEG-TS) reproducing device that reproduces an MPEG transport stream according to MPEG (Moving Picture Expert Group), from the digital data received by said digital data receiving device;
- a reproducing device that classifies the MPEG transport stream reproduced by said MPEG transport stream reproducing device, into at least picture data, audio data, and private data, and buffers and decodes each of the picture data, audio data and private data, so as to generate a reproduction signal, said private data including control information comprising data for matching a reproduction state of a reproducing device of a digital data transmitting apparatus with a reproduction state of the digital data receiving apparatus that receives the digital data; and
- a control device that controls said reproducing device based on said private data.

6. A digital data receiving apparatus according to claim 5, wherein said private data comprises information indicating at least one operating state of the reproducing device that is selected from a reproduction speed, a reproduction direction, a stillpicture mode, freeze-frame feed, a pause, a stop or play-back, and wherein said control device controls a reproducing operation of the reproducing device based on said information.

7. A digital data receiving apparatus according to claim 5, wherein the private data comprises information relating to control of said buffering of said reproducing device, and wherein said control device controls said buffering of the reproducing device based on the information relating to control of said buffering.

8. A digital data receiving apparatus according to claim 5, wherein said reproducing device includes a buffer memory that temporarily stores the picture data, and the private data contains control information as a command to clear the buffer memory, while the control device clears the buffer memory based on the control information.

9. A digital data transmitting apparatus comprising:
- a reproducing device that classifies digital data in the form of serial packet data comprising picture data, audio data and other data that are read at a variable rate from a digital data medium and demodulated, into at least picture data, audio data and other data, and buffers and decodes each of the picture data, audio data and other data, so as to generate a reproduction signal;
- an MPEG transport stream (MPEG-TS) generating device that generates an MPEG transport stream based on said digital data according to MPEG (Moving Picture Expert Group), wherein said MPEG-TS generating device generates the MPEG transport stream, based on all of the picture data, audio data and other data, or at least one type of data selected from the picture data, audio data or other data, and packets control information as private data, said control information comprising data for matching a reproduction state of said reproducing device with a reproduction state of a receiver-side apparatus that receives digital transmission data; and
- a digital interface device that converts the MPEG transport stream generated by said MPEG transport stream generating device, into the digital transmission data, and transmits the digital transmission data at a predetermined transmission rate.

10. A digital data transmitting apparatus according to claim 9, wherein the control information comprises information indicating at least one operating state of the reproducing device that is selected from a reproduction speed, a reproduction direction, a still-picture mode, freeze-frame feed, a pause, a stop or play-back.

11. A digital data transmitting apparatus according to claim 9, wherein the control information comprises information relating to control of said buffering of said reproducing device.

12. A digital data transmitting apparatus according to claim 9, wherein said reproducing device includes a buffer memory that temporarily stores the picture data, and wherein the control information comprises information indicating that the buffer memory has been cleared.

13. A digital data transmitting apparatus comprising:
- a reproducing device that classifies digital data in the form of serial packet data comprising picture data, audio data and other data that are read at a variable rate from a digital data medium and demodulated, into at least picture data, audio data and other data, and buffers and decodes each of the picture data, audio data and other data, so as to generate a reproduction signal;
- an MPEG transport stream (MPEG-TS) generating device that generates an MPEG transport stream based on said digital data according to MPEG (Moving Picture Expert Group), wherein said reproducing device extracts sub-picture data from the digital data read at a variable rate from the digital data medium, and wherein said MPEG-TS generating device packets the extracted sub-picture data as independent private data; and
- a digital interface device that converts the MPEG transport stream generated by said MPEG transport stream generating device into digital transmission data, and transmits the digital transmission data at a predetermined transmission rate.

* * * * *